3,000,874
SULFATE SALT OF ERYTHROMYCIN
MONOESTER
Malcolm D. Bray, Noblesville, and Verlin C. Stephens, Indianapolis, Ind., assignors to Eli Lilly and Company, Indianapolis, Ind., a corporation of Indiana
No Drawing. Filed Apr. 8, 1959, Ser. No. 804,874
9 Claims. (Cl. 260—210)

This invention relates to novel salts of erythromycin esters. More particularly, this invention relates to aliphatic sulfate salts of erythromycin esters in which the erythromycin ester is a monoester of a lower aliphatic carboxylic acid.

The novel compounds of this invention can be represented by the following formula

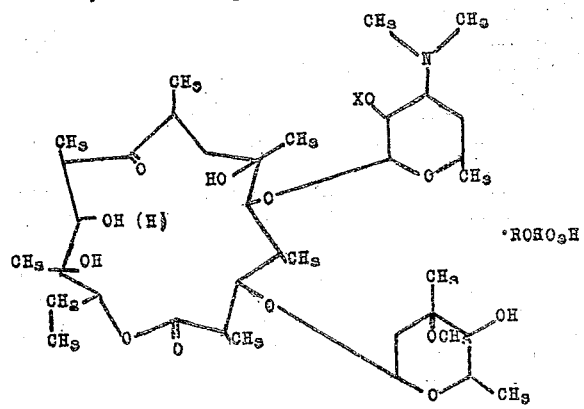

in which X represents the esterifying radical of a lower aliphatic carboxylic acid, and R represents an aliphatic hydrocarbon radical having from 8 to 31 carbon atoms. Erythromycin B is represented when the H in parentheses is substituted for the adjacent OH.

Illustrative aliphatic carboxylic acid radicals represented by X in the foregoing formula include the acetyl, the methoxyacetyl, the monoethylsuccinyl, the monoethylcarbonyl, and the butyryl radicals.

Illustrative aliphatic sulfuric acids include those having straight and branched chains, and saturated and unsaturated aliphatic hydrocarbon radicals, for example, the octyl, lauryl, oleyl, tetradecyl, stearyl, eicosyl, 2-ethylhexyl, linoleyl, and tetradecenyl radicals. Many aliphatic sulfuric acids are known and are commercially available, generally in the form of their salts. Others are readily prepared by the procedures described in Industrial and Engineering Chemistry 43, 2022 (1951). The preferred sulfates are straight chain alkyl sulfates having from 10 to 20 carbon atoms, since such sulfates provide tasteless salts which are readily crystallizable and have physical properties which make them especially suitable for the preparation of pharmaceutical compositions.

The novel salts of this invention are white solids which have a very low solubility in water. They are appreciably soluble in 80 percent aqueous acetone, but are less soluble in absolute acetone. In dilute, e.g., 30 percent, aqueous acetone they are substantially insoluble. They are quite soluble in chloroform. They are somewhat soluble in the lower alcohols and dioxane, and can be precipitated from solution in such solvents by the addition of water.

The novel sulfate salts are prepared by a neutralization reaction in which the erythromycin ester in base form is reacted with the aliphatic sulfuric acid, or by a metathetical reaction in which an anionic salt of the erythromycin ester is reacted with a cationic salt of the aliphatic sulfuric acid. The above reactions are carried out in a solvent which is inert to the reagents. Preferably, the solvent is one having substantial solubility for the reagents but only slight solubility for the reaction product, or is one which can be appropriately diluted so that it will have little solubility for the reaction product.

Because of the more ready availability of aliphatic sulfuric acids in their cationic salt forms, the methathetical reaction is preferred for the preparation of the erythromycin ester salts.

The method of preparing the aliphatic sulfate salt of an erythromycin compound by the neutralization reaction comprises treating a solution of the erythromycin compound in a suitable solvent such as acetone, and adding to the solution a stoichiometric equivalent of an aqueous or aqueous acetone solution of the aliphatic sulfuric acid. Upon the mixing of the two solutions, and if necessary, partial evaporation, or dilution of the solution with water to reduce the organic solvent concentration to below about 30 percent, the aliphatic sulfate salt of the erythromycin ester precipitates. The precipitate is recovered in any suitable manner as by filtration, centrifugation, and the like.

A procedure similar to that described above can be employed for the preparation of the sulfate salt by a metathetical reaction. In such case an anionic salt of the erythromycin ester and a cationic salt of the aliphatic sulfuric acid are employed. Alternatively, a solution of a cationic salt of the aliphatic sulfate is added to a solution of the erythromycin ester in base form, and either simultaneously with or subsequently to the addition of the aliphatic sulfate, a stoichiometric equivalent of a strong acid is added to the reaction mixture to form the anionic salt of the erythromycin ester and cause its reaction with the cationic salt of the aliphatic sulfate with the formation of the erythromycin ester sulfate salt. In the event a weak acid, e.g., acetic acid, is employed, to form the erythromycin salt, it is generally desirable to add somewhat over one mol equivalent of the acid.

For carrying out the metathetical reaction, the preferred cationic sulfate salts are those which are water soluble. However, a sulfate salt having only a slight water solubility can be employed if the erythromycin ester salt is so selected that the anionic portion of the salt will form an insoluble salt with the cationic portion of the sulfate salt. Such is the case, for example, if the silver salt of the aliphatic sulfuric acid and the hydrochloride salt of the erythromycin ester are reacted. The insoluble silver chloride which is formed is separated from the aliphatic sulfate salt of the erythromycin ester, and the latter is then recovered.

By means of the above-described procedures, a wide variety of aliphatic sulfate salts of erythromycin esters can be prepared, illustrative examples of which are: Monoacetylerythromycin octylsulfate, monopropionylerythromycin 2-ethyl-hexylsulfate, monopropylsuccinylerythromycin eicosylsulfate, monobutyrylerythromycin dodecenylsulfate, monobutylmaleylerythromycin nonylsulfate, monoethylmaleylerythromycin oleylsulfate, monopropylsuccinylerythromycin cetylsulfate, monopropionylerythromycin stearylsulfate, monoethylcarbonylerythromycin undecylsulfate, monoacetylerythromycin myristylsulfate, monocrotonylerythromycin stearylsulfate, monomethoxyacetylerythromycin myristylsulfate, monoethylglutarylerythromycin laurylsulfate, monopropargylcarbonylerythromycin laurylsulfate, and monopropionylerythromycin melissylsulfate.

The novel compounds provided by this invention have several advantages from a therapeutic standpoint over the several esterified erythromycin derivatives which hitherto have been proposed or used for the therapeutic treatment of bacterial infections. For example, the novel compounds are surprisingly stable under acid conditions. Thus, the novel ester salts of this invention can withstand exposure to acid solution of about pH 2 for upwards of several hours without appreciable destruction of their antibacterial potency. This is in sharp contrast to esters such as the monopropionyl ester of erythromycin, the ethylcarbonate ester of erythromycin, or like aliphatic carboxylic acid esters, which lose substantially all of their antibacterial potency within about three minutes. Moreover, the novel compounds of this invention, especially those salts made from sulfates having upwards of 9 carbon atoms, unlike most erythromycin ester derivatives, do not possess the extremely and nauseatingly bitter taste associated with erythromycin. Thus, the compounds are especially suitable for the provision of suspensions for pediatric use where taste of the medicament is of extreme importance. The absence of unpleasant taste is of importance also in the provision of erythromycin-containing animal feeds. Furthermore, the provision of an ester derivative of erythromycin in the form of its aliphatic sulfate salt enhances the ability of the particular derivative to provide on oral administration an erythromycin blood level which is superior to that obtainable with the parent ester. Illustratively, the oral administration of the laurylsulfate salt of the monopropionyl ester of erythromycin gives a higher erythromycin blood level than is obtainable by the administration of a like quantity of the ester base. Comparably increased blood levels can be obtained by the administration of the stearyl sulfate salt of the ethylcarbonate ester of erythromycin. The increase in blood levels obtainable is especially noticeable when the patient to whom the medicament is administered is not in a fasting condition, that is, when at least some food is present in the patient's stomach.

The novel compounds of this invention can be administered in the usual dosage forms such as compressed tablets, filled capsules, and suspensions. Since the compositions are tasteless, pleasantly flavored aqueous suspensions can readily be formulated. Since the compounds are acid stable, high erythromycin blood levels can be secured by administration of ordinary compressed tablets or filled capsules without having to resort to the coating of the tablets or capsules with an enteric material to prevent contact of the medicament with the acidic contents of the stomach and consequent loss of antibiotic potency of the medicament.

A suspension suitable for pediatric use can be prepared from the following ingredients in the amounts shown:

| | g. |
|---|---|
| Monopropionylerythromycin laurylsulfate | 42 |
| Sucrose | 350 |
| Sodium cyclamate | 5 |
| Sodium citrate | 4 |
| Citric acid | 1 |
| Sodium chloride | 2.5 |
| Monosodium glutamate | 0.5 |
| Sodium laurylsulfate | 2.5 |
| Sorbitan trioleate | 0.1 |
| Synthetic lemon flavor | 1.2 |
| Distilled water, added to make 1 l. | |

Administration of one teaspoonful of the suspension provides a dose amount equivalent to about 125 mg. of erythromycin base.

If desired, the suspension can be packaged in ready-to-use form. However, in the event a relatively long period of time may elapse prior to use of the suspension, it is preferable to provide the composition in dry form. In such form, the composition is indefinitely stable, and can readily be made up into a usable suspension by addition of the appropriate amount of water.

An illustrative composition suitable for filling into telescopic gelatin capsules is prepared from the following ingredients in the amounts shown:

| | Kg. |
|---|---|
| Monoacetylerythromycin decylsulfate | 7 |
| Magnesium stearate | 0.05 |
| Talc | 0.5 |

The ingredients are thoroughly blended in a mixer and the blended mixture is filled into gelatin capsules of a size such that each capsule contains about 385 mg. of monoacetylerythromycin decyclsulfate which is equivalent to about 250 mg. of erythromycin base.

Since the novel salts of this invention have a tendency to be somewhat fluffy, it may at times be difficult to secure sufficiently compact material to permit the filling of the desired therapeutic dose amount in a gelatin capsule of such size that it can readily be swallowed. In such event, the material can be densified by compressing it into slugs and forcing the slugged material through a No. 20 sieve. The compacted, sieved material can then be mixed with the desired excipients and filled into gelatin capsules.

An illustrative composition suitable for formulation into compressed tablets is made up of the following ingredients in the amounts shown:

| | Kg. |
|---|---|
| Monopropionylerythromycin laurylsulfate | 35 |
| Magnesium stearate | 1.1 |
| Starch powder | 9.4 |

The erythromycin compound, 600 g. of the magnesium stearate and 5.5 kg. of the starch powder are thoroughly mixed and are compressed into slugs. The slugs are sieved through a No. 12 screen. The remainder of the starch and magnesium stearate is then mixed with the screened material, and the mixture is compressed on a standard tabletting machine into tablets weighing about 500 mg. Each tablet contains the equivalent of about 250 mg. of erythromycin base.

This invention is further illustrated by the following specific examples:

EXAMPLE 1

*Preparation of monopropionylerythromycin laurylsulfate*

8.4 g. of the monopropionly ester of erythromycin are dissolved in 50 ml. of warm acetone, and to the solution are added 2.66 g. of laurylsulfuric acid dissolved in 50 ml. of 50 percent aqueous acetone. 100 ml. of water are added whereupon the laurylsulfate salt of propionylerythromycin precipitates. The precipitate is filtered off and dried. It melts at about 135–137° C.

EXAMPLE 2

*Preparation of monopropionylerythromycin laurylsulfate*

16.7 g. of monopropionylerythromycin are dissolved in 50 ml. of warm acetone. To the solution are added 6.4 g. of sodium laurylsulfate dissolved in 50 ml. of distilled water containing 2 ml. of glacial acetic acid. The white crystalline precipitate of monopropionylerythromycin laurylsulfate which separates is filtered off and dried. It melts at about 135–137° C.

EXAMPLE 3

*Preparation of monomethoxyacetylerythromycin octylsulfate*

To a solution of 3.95 g. of erythromycin in 15 ml. of acetone are added slowly and with stirring 0.6 g. of methoxyacetylchloride dissolved in 5 ml. of acetone. The mixture is allowed to stand at room temperature for two hours during which time the hydrochloride salt of monomethoxyacetylerythromycin precipitates.

The precipitate is suspended in the supernatant liquid by vigorous stirring, and to the suspension is added a solution of 1.3 g. of sodium octylsulfate dissolved in 20 ml. of water. An additional amount of 40 ml. of water is added whereupon the octylsulfate salt of monomethoxyacetylerythromycin precipitates. The precipitate is filtered off and dried.

EXAMPLE 4

*Preparation of monoethylcarbonylerythromycin cetylsulfate*

8.85 g. of the monoethylcarbonate ester of erythromycin are dissolved in 50 ml. of ethanol containing 1 ml. of glacial acetic acid. To the solution are added 3.8 g. of the sodium salt of cetylsulfuric acid in 50 ml. of warm water. The reaction mixture is evaporated in vacuo at room temperature to remove the bulk of the alcohol, whereupon a crystalline precipitate of the cetylsulfate salt of monoethylcarbonylerythromycin forms. The precipiate is filtered off and is dried in vacuo at room temperature.

EXAMPLE 5

*Preparation of monoethylsuccinylerythromycin laurylsulfate*

To 9.4 g. of the monoethylsuccinic acid ester of erythromycin dissolved in 50 ml. of acetone are added 4 g. of sodium laurylsulfate dissolved in 100 ml. of 50 percent aqueous acetone. To the reaction mixture are added 100 ml. of 0.1 N hydrochloric acid whereupon a precipitate of monoethylsuccinylerythromycin laurylsulfate separates. The precipitate is filtered off and dried. It melts at about 128–130° C.

EXAMPLE 6

*Preparation of monobutyrylerythromycin 2-ethylhevylsulfate*

31 g. of erythromycin are dissolved in 120 ml. of acetone, 8.3 ml. of n-butyric anhydride are added, and the mixture is allowed to stand several hours at room temperature during which time mono-n-butyrylerythromycin forms. To the mixture are added 27 ml. of a 38 percent solution of sodium 2-ethylhexylsulfate. The reaction mixture is diluted with 200 ml. of water to precipitate the 2-ethylhexylsulfate salt of mono-n-butyrylerythromycin, and the precipitated salt is filtered off and dried.

EXAMPLE 7

*Preparation of monoacrylylerythromycin laurylsulfate*

8.3 g. of monoacrylylerythromycin are dissolved in 50 ml. of warm acetone and to the solution are added 3.2 g. of sodium laurylsulfate dissolved in 80 ml. of distilled water containing 1 ml. of glacial acetic acid. The mixture is allowed to stand until crystals appear, and 50 ml. of water are then added with stirring. The white crystalline precipitate of monoacrylylerythromycin laurylsulfate which separates is filtered off and dried. It melts at about 133–137° C.

EXAMPLE 8

*Preparation of monoethylcarbonylerythromycin laurylsulfate*

8.5 g. of monoethylcarbonylerythromycin are dissolved in 50 ml. of warm acetone. To the solution are added 3.2 g. of sodium laurylsulfate dissolved in 80 ml. of distilled water containing 1 ml. of glacial acetic acid. The mixture is allowed to stand until crystals appear, and 50 ml. of water are then added with stirring. The white crystalline precipitate of monoethylcarbonylerythromycin laurylsulfate which separates is filtered off and dried. It melts at about 125–129° C.

EXAMPLE 9

*Preparation of monomethoxyacetylerythromycin laurylsulfate*

8.4 g. of monomethoxyacetylerythromycin are dissolved in 50 ml. of warm acetone. To the solution are added 3.2 g. of sodium laurylsulfate dissolved in 80 ml. of distilled water containing 1 ml. of glacial acetic acid. The mixture is allowed to stand until crystals appear, and 50 ml. of water are then added with stirring. The white, crystalline precipitate of monomethoxyacetylerythromycin laurylsulfate which separates is filtered off and dried. It melts at about 129–135° C.

EXAMPLE 10

*Preparation of monoacetylerythromycin oleylsulfate*

To a solution of 32.6 g. of monoacetylerythromycin in 200 ml. of acetone are added 16.3 g. of sodium oleylsulfate dissolved in 200 ml. of hot (60° C.) water containing 4 ml. of glacial acetic acid. The mixture is evaporated in vacuo at room temperature to remove the bulk of the acetone and to cause substantially complete precipitation of monoacetylerythromycin oleylsulfate. The precipitated salt is filtered off and dried in vacuo.

Using the above procedure, there can readily be prepared the following erythromycin ester salts:

Monopropionylerythromycin 7-ethyl-2-methylundecyl-4-sulfate (M.P. 107–115° C.); monopropionylerythromycin 3,9-diethyltriecyl-6-sulfate (M.P. 100–105° C.); monopropionylerythromycin stearylsulfate (M.P. 119–125° C.); monoacetylerythromycin laurylsulfate (M.P. 130–132° C.); mono-n-butyrylerythromycin laurylsulfate (M.P. 132–135° C.); monopropionylerythromycin octylsulfate (M.P. 128–131° C.); and monopropionylerythromycin 2-ethylhexylsulfate (M.P. 128–132° C.)

EXAMPLE 11

*Preparation of monoacetylerythromycin B laurylsulfate*

To 15 g. of erythromycin B dissolved in 120 ml. of hot (50° C.) acetone are added 2.6 ml. of acetic anhydride. The mixture is allowed to stand 2 hours during which time monoacetylerythromycin B is formed. 6.4 g. of sodium laurylsulfate dissolved in 120 ml. of water are added, and the mixture is diluted with 150 ml. of water. The white, crystalline monoacetylerythromycin B laurylsulfate which separates is filtered off and dried. It melts at about 115–117° C.

Any of the foregoing examples can be repeated using erythromycin B instead of the erythromycin specified in the examples.

We claim:

1. A sulfate salt of a lower aliphatic carboxylic acid monoester of the group consisting of erythromycin and erythromycin B, said sulfate salt being an aliphatic hydrocarbonsulfate salt in which the aliphatic group has from 8 to 31 carbon atoms.

2. A sulfate salt of a lower aliphatic carboxylic acid monoester of erythromycin, said sulfate salt being an alkylsulfate salt in which the alkyl group has from 8 to 31 carbon atoms.

3. A sulfate salt of a lower alkyl monocarboxylic acid monoester of erythromycin, said sulfate salt being an alkylsulfate in which the alkyl group has from 8 to 31 carbon atoms.

4. A sulfate salt of monopropionylerythromycin, said sulfate salt being a straight chain alkylsulfate having from 10 to 20 carbon atoms.

5. Monopropionylerythromycin laurylsulfate.
6. Monoethylcarbonylerythromycin laurylsulfate.
7. Monoethylsuccinylerythromycin laurylsulfate.
8. Monoacrylerythromycin laurylsulfate.
9. Monoacetylerythromycin laurylsulfate.

References Cited in the file of this patent
UNITED STATES PATENTS 2,537,934　　Lott ------------------ Jan. 9, 1951

OTHER REFERENCES

Griffith: AM & CT, vol. V, October 1958, pp. 609–613.